United States Patent
Hou et al.

(10) Patent No.: US 11,295,901 B2
(45) Date of Patent: Apr. 5, 2022

(54) HYBRID ELECTRODE MATERIALS FOR BIPOLAR CAPACITOR-ASSISTED SOLID-STATE BATTERIES

(71) Applicant: GM GLOBAL TECHNOLOGY OPERATIONS LLC, Detroit, MI (US)

(72) Inventors: Mengyan Hou, Shanghai (CN); Haijing Liu, Shanghai (CN); Mark W. Verbrugge, Troy, MI (US); Xiaochao Que, Shanghai (CN); Qili Su, Shanghai (CN); Meiyuan Wu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 203 days.

(21) Appl. No.: 16/541,811

(22) Filed: Aug. 15, 2019

(65) Prior Publication Data
US 2021/0050157 A1    Feb. 18, 2021

(51) Int. Cl.
*H01G 9/00*     (2006.01)
*H01G 9/022*    (2006.01)
(Continued)

(52) U.S. Cl.
CPC .......... *H01G 9/038* (2013.01); *G02F 1/1523* (2013.01); *H01G 9/155* (2013.01); *H01G 11/06* (2013.01);
(Continued)

(58) Field of Classification Search
CPC ............... H01M 2220/20; H01M 4/13; H01M 10/0525; H01G 11/06; H01G 9/038
See application file for complete search history.

(56) References Cited

U.S. PATENT DOCUMENTS 10,418,668 B2    9/2019  Wu et al.
10,637,040 B2    4/2020  Zhang et al.
(Continued)

FOREIGN PATENT DOCUMENTS

| CN | 112310469 A | 2/2021 |
| CN | 112397793 A | 2/2021 |
| WO | 2017206095 A1 | 12/2017 |

OTHER PUBLICATIONS

Hou et al.; U.S. Appl. No. 16/523,324 entitled "Capacitor Assisted Bipolar Battery," filed Jul. 29, 2019.
(Continued)

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

A bipolar capacitor-assisted solid-state battery is disclosed that includes a plurality of electrochemical battery unit cells, each of which includes a negative electrode, a positive electrode, and a lithium ion-conductive electrolyte-containing separator disposed between the negative electrode and the positive electrode. The lithium ion-conductive electrolyte-containing separator of each electrochemical battery unit cell comprises a solid-state electrolyte material, and, additionally, at least one negative electrode of the electrochemical battery unit cells or at least one positive electrode of the electrochemical battery unit cells includes a capacitor material. The bipolar capacitor-assisted solid-state battery further includes a bipolar current collector disposed between a negative electrode of one electrochemical battery unit cell and a positive electrode of an adjacent electrochemical battery unit cell. A method for manufacturing the disclosed bipolar capacitor-assisted solid-state battery is also disclosed.

15 Claims, 5 Drawing Sheets

(51) Int. Cl.
  *H01G 11/06* (2013.01)
  *G02F 1/1523* (2019.01)
  *H01M 10/0525* (2010.01)
  *H01G 11/24* (2013.01)
  *H01G 11/02* (2013.01)

(52) U.S. Cl.
  CPC ........ *H01G 11/24* (2013.01); *H01M 10/0525* (2013.01); *H01G 11/02* (2013.01)

(56) References Cited

U.S. PATENT DOCUMENTS

| | | | |
|---|---|---|---|
| 10,658,663 | B2 | 5/2020 | Zhang et al. |
| 10,756,385 | B2 | 8/2020 | Deng |
| 10,944,100 | B2 | 3/2021 | Liu et al. |
| 2013/0162216 | A1 | 6/2013 | Zhamu et al. |
| 2016/0027591 | A1 | 1/2016 | Murakami et al. |
| 2016/0308195 | A1 | 10/2016 | Mui et al. |
| 2018/0034037 | A1 | 2/2018 | Zhang et al. |
| 2018/0034094 | A1 | 2/2018 | Liu et al. |
| 2018/0358656 | A1 | 12/2018 | Deng |
| 2019/0206632 | A1 | 7/2019 | Zhamu et al. |
| 2019/0252728 | A1* | 8/2019 | Shimizu ............... H01M 10/425 |
| 2019/0305378 | A1 | 10/2019 | Ogihara |
| 2019/0363395 | A1* | 11/2019 | Chen ................. H01M 10/0562 |
| 2019/0372103 | A1* | 12/2019 | Miki ................... H01M 4/1391 |
| 2019/0372186 | A1 | 12/2019 | Kong et al. |
| 2020/0036070 | A1 | 1/2020 | Li et al. |
| 2020/0075960 | A1* | 3/2020 | Wachsman .......... H01M 4/8621 |
| 2021/0028481 | A1 | 1/2021 | Hou et al. |

OTHER PUBLICATIONS

Tong et al., "Numerical Investigation of water cooling for a lithium-ion bipolar battery pack," International Journal of Thermal Sciences 94 (2015) 259-269 (Year: 2015).

Verbrugge et al., "Activated-carbon electric-double-layer capacitors: electrochemical characterization and adaptive algorithm implementation," Journal of Power Sources, vol. 141 (2005) pp. 369-385.

Verbrugge et al., "Analytic Solution and Experimental Data for Cyclic Voltammetry and Constant-Power Operation of Capacitors Consistent with HEV Applicatoins," Journal of The Electrochemical Society, vol. 153 (6) (2006) pp. A1237-A1245.

Verbrugge et al., "Microstructural Analysis and Mathematical Modeling of Electrical Double-Layer Supercapacitors," Journal of The Electrochemical Society, vol. 152 (5) (2005) pp. D79-D87.

Zheng et al., "A hybrid electrochemical device based on a synergistic inner combination of Li ion battery and Li ion capacitor for energy storage," Sci. rep. 7, 4910 (Year: 2017).

Zuo et al., "Battery-Supercapacitor Hybrid Devices: Recent Progress and Future Prospects," Adv. Sci. Apr. 2017, 1600538 (Year: 2017).

Zhong et al. "Improved energy density of quasi-solid-state supercapacitors using sandwich-type redox-active gel polymer electrolytes." Electrochimica Acta 166 (2015) 150-156 (Year: 2015).

Liu et al. "Preparation and chemical compatibility of lithium aluminum germanium phosphate solid electrolyte." Solid State Ionics 318 (2018) 27-34 (Year: 2018).

* cited by examiner

HYBRID ELECTRODE MATERIALS FOR BIPOLAR CAPACITOR-ASSISTED SOLID-STATE BATTERIES

INTRODUCTION

Lithium ion batteries are a class of batteries that reversibly exchange lithium ions between opposed electrodes disposed on opposite sides of an electrolyte-containing separator. Solid-state lithium ion batteries include solid electrodes and an ionically-conductive solid electrolyte disposed between the electrodes. These types of batteries are different from more conventional battery architectures in which a microporous polymer with an infiltrated liquid electrolyte is positioned between the electrodes to facilitate ionic transport. Solid-state batteries have the potential to achieve higher energy densities and to operate within a wider temperature window than current lithium ion batteries that utilize a free liquid electrolyte. Eliminating the need to use a free-flowing liquid electrolyte, which typically includes a non-aqueous solvent and a dissolved lithium salt for lithium ion mobility, may also desired in certain battery applications.

The use of lithium ion batteries may be limited in certain applications as a result of low energy density and insufficient power capability, particularly for high power and low voltage applications such as an under-hood start-up battery for a motor vehicle. Under-hood start-up batteries also must be able to function well at cold temperatures. The ability of a battery to deliver high power for a short duration at cold temperatures is often specified in cold-cranking amps or some other metric. For instance, to have confidence that a battery will be able to move engine cylinders and start a vehicle unassisted at cold temperatures, some specifications require a battery to deliver 6 kW of power for 0.5 seconds at $-30°$ C. The present disclosure helps improve the power density of solid-state lithium ion batteries to improve their cold-cranking performance.

SUMMARY OF THE DISCLOSURE

A bipolar capacitor-assisted solid-state battery according to one embodiment of the present disclosure includes a negative end plate current collector, a positive end plate current collector, and a plurality of electrochemical battery unit cells positioned between the negative end plate current collector and the positive end plate current collector. Each of the electrochemical battery unit cells includes a negative electrode, a positive electrode, and a lithium ion-conductive electrolyte-containing separator disposed between the negative electrode and the positive electrode. The lithium ion-conductive electrolyte-containing separator of each electrochemical battery unit cell comprises a solid-state electrolyte material and does not include a free liquid electrolyte. Additionally, at least one negative electrode of the electrochemical battery unit cells or at least one positive electrode of the electrochemical battery unit cells includes a capacitor material. The bipolar capacitor-assisted solid-state battery also includes a plurality of bipolar current collectors. Each of the plurality of bipolar current collectors is disposed between a negative electrode of one electrochemical battery unit cell and a positive electrode of an adjacent electrochemical battery unit cell.

The bipolar capacitor-assisted solid-state battery of the aforementioned embodiment may include additional features or be further defined. For instance, in one implementation, the negative electrode of at least one electrochemical battery unit cell may comprise a mixture of active negative electrode material particles, solid-state electrolyte material particles, and capacitor material particles, and the capacitor material particles may be comprised of a supercapacitor material. In another implementation, the negative electrode of each electrochemical battery unit cell may comprise the mixture of active negative electrode material particles, solid-state electrolyte material particles, and capacitor material particles. Still further, in another implementation, the positive electrode of at least one electrochemical battery unit cell may comprise a mixture of active positive electrode material particles, solid-state electrolyte material particles, and capacitor material particles, and the capacitor material particles may be comprised of a supercapacitor material. And, in another implementation, the positive electrode of each electrochemical battery unit cell may comprise the mixture of active positive electrode material particles, solid-state electrolyte material particles, and capacitor material particles.

As another example, and in another implementation of the capacitor-assisted solid-state battery, the negative electrode of at least one electrochemical battery unit cell may comprises a mixture of active negative electrode material particles, solid-state electrolyte material particles, and capacitor material particles, with the capacitor material particles in the negative electrode being comprised of a supercapacitor material, and additionally the positive electrode of at least one electrochemical battery unit cell may comprises a mixture of active positive electrode material particles, solid-state electrolyte material particles, and capacitor material particles, with the capacitor material particles of the positive electrode also being comprised of a supercapacitor material. In another implementation, the negative electrode of each electrochemical battery unit cell may comprise the mixture of active negative electrode material particles, solid-state electrolyte material particles, and capacitor material particles, and the positive electrode of each electrochemical battery unit cell may comprise the mixture of active positive electrode material particles, solid-state electrolyte material particles, and capacitor material particles.

In yet another implementation of the capacitor-assisted solid-state battery, the negative electrode of at least one electrochemical battery unit cell may comprise a base portion and a coating overlying the base portion. The base portion may comprise a mixture of active negative electrode material particles and solid-state electrolyte material particles, and the coating may comprise capacitor material particles comprised of a supercapacitor material. Likewise, in another implementation, the negative electrode of each electrochemical battery unit cell may comprise the base portion and the coating overlying the base portion. Still further, in another implementation of the capacitor-assisted solid-state batter, the positive electrode of at least one electrochemical battery unit cell may comprise a base portion and a coating overlying the base portion. The base portion may comprise a mixture of active positive electrode material particles and solid-state electrolyte material particles, and the coating may comprise capacitor material particles comprised of a supercapacitor material. Moreover, in another implementation, the positive electrode of each electrochemical battery unit cell may comprise the base portion and the coating overlying the base portion.

In yet another implementation of the capacitor-assisted solid-state battery, the negative electrode of at least one electrochemical battery unit cell may comprise a base portion and a coating overlying the base portion, and the positive electrode of at least one electrochemical battery unit cell may comprise a base portion and a coating overlying the base portion. The base portion of the negative electrode may comprise a mixture of active negative electrode material particles and solid-state electrolyte material particles, and the coating of the negative electrode may comprise capacitor material particles comprised of a supercapacitor. Similarly, the base portion of the positive electrode may comprise a mixture of active positive electrode material particles and solid-state electrolyte material particles, and the coating of the positive electrode may comprise capacitor material particles comprised of a supercapacitor material. In another implementation, the negative electrode of each electrochemical battery unit cell may comprise a base portion and a coating overlying the base portion, and the positive electrode of each electrochemical battery unit cell may comprise a base portion and a coating overlying the base portion. The base portion of the negative electrodes may comprise a mixture of active negative electrode material particles and solid-state electrolyte material particles, and the coating of the negative electrodes may comprise capacitor material particles comprised of a supercapacitor material. Similarly, the base portion of the positive electrodes may comprise a mixture of active positive electrode material particles and solid-state electrolyte material particles, and the coating of the positive electrodes may comprise capacitor material particles comprised of a supercapacitor material.

In various implementations of the capacitor-assisted solid-state battery, the solid-state electrolyte material that comprises the lithium ion-conductive electrolyte-containing separator of each electrochemical battery unit cell may be an inorganic solid. In other implementations, the at least one negative electrode of the electrochemical battery unit cells or the at least one positive electrode of the electrochemical battery unit cells may comprise capacitor material particles intermixed with active electrode material particles and solid-state electrolyte material particles. Furthermore, the at least one negative electrode of the electrochemical battery unit cells or the at least one positive electrode of the electrochemical battery unit cells may include a base portion and a coating that overlies the base portion, with the base portion comprising a mixture of active electrode material particles and solid-state electrolyte particles and the coating comprising capacitor material particles. In other implementations, a voltage between 5 V and 200 V may be established across the negative end plate current collector and the positive end plate current collector when the battery is fully charged.

A method of manufacturing a bipolar capacitor-assisted solid-state battery according to one embodiment of the present disclosure includes several steps. One step involves producing a bipolar electrode of the bipolar capacitor-assisted solid-state battery. This step may include (i) forming a first electrode onto one side of a bipolar current collector, with the first electrode being composed as either a negative electrode or a positive electrode; (ii) forming a second electrode onto the bipolar current collector on a side of the bipolar current collector opposite from the side onto which the first electrode is formed, with the second electrode being composed as either a negative electrode or a positive electrode, whichever is opposite from that of the first electrode, and with at least the first electrode, the second electrode, or both the first electrode and the second electrode including a capacitor material; and (iii) forming a lithium ion-conductive electrolyte-containing separator onto the first electrode, the second electrode, or both the first electrode and the second electrode, with the lithium ion-conductive electrolyte-containing separator comprising a solid-state electrolyte material and being devoid of a free liquid electrolyte. Another step of the method involves stacking the bipolar electrode with one or more other bipolar electrodes to form the bipolar capacitor-assisted solid-state battery.

DETAILED DESCRIPTION

Figures 1, 2, 3:
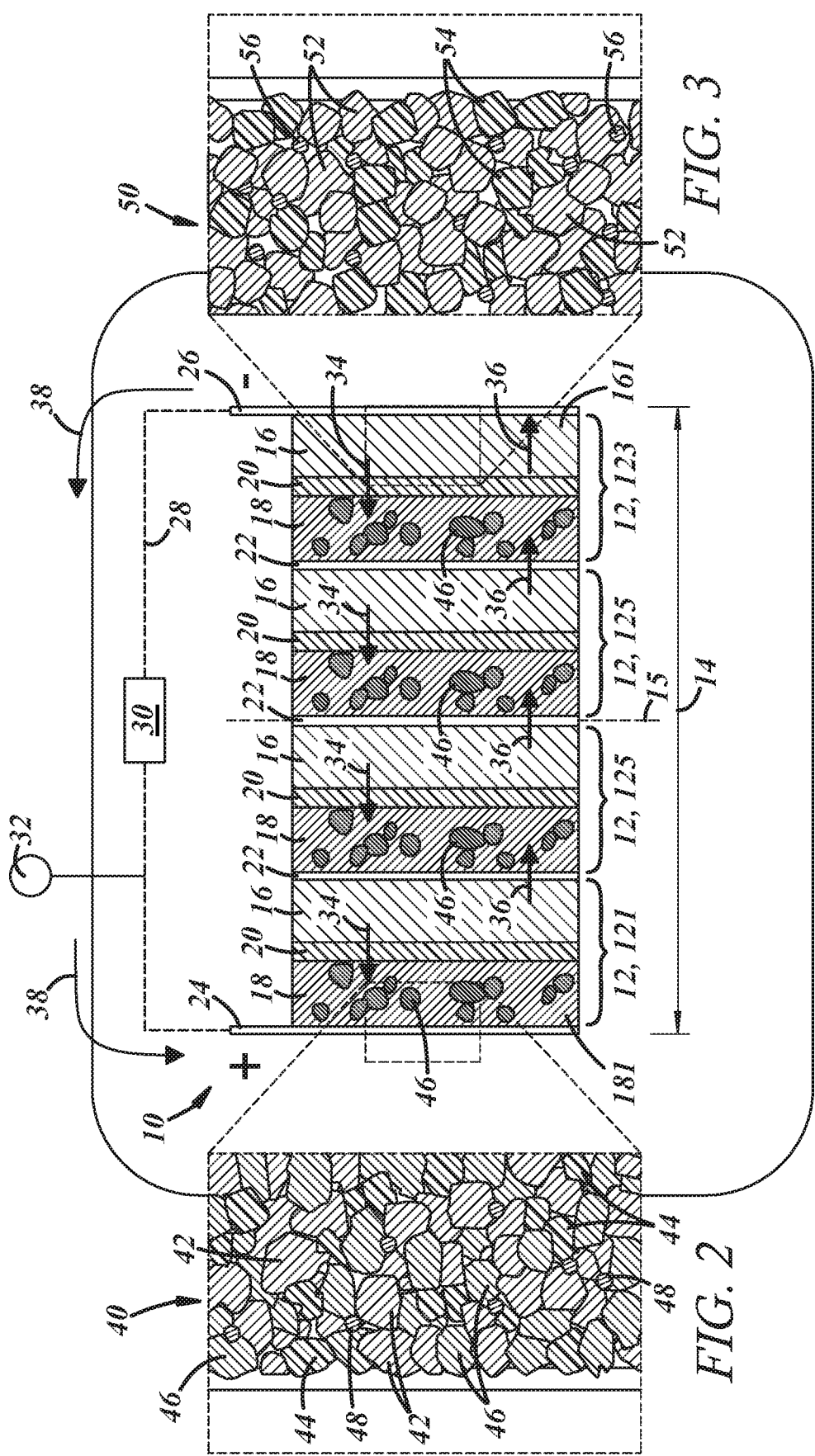
FIG. 1 is an idealized cross-sectional view of a bipolar capacitor-assisted solid-state battery according to one embodiment of the present disclosure.
FIG. 2 is a partial magnified view of the positive electrode of one of the electrochemical battery unit cells of the battery shown in FIG. 1, wherein the positive electrode includes a mixture of active positive electrode material particles, capacitor material particles, and solid-state electrolyte material particles.
FIG. 3 is a partial magnified view of the negative electrode of one of the electrochemical battery unit cells of the battery shown in FIG. 1, wherein the negative electrode includes a mixture of active negative electrode material particles and solid-state electrolyte material particles.

The present disclosure is directed to a bipolar capacitor-assisted solid-state battery of the lithium ion variety and a method of making the battery. The disclosed battery seeks to achieve good and reliable energy capacity and power density so that the battery can function effectively under cold cranking conditions. To achieve this functionality, a capacitor material is incorporated into at least one of the electrodes of at least one of the electrochemical battery unit cells of the battery along with an active electrode material and a solid-state electrolyte material. The capacitor material is a supercapacitor material that can store charge electrostatically (non-electrochemically); that is, the supercapacitor stores at least some charge on its surface as an electric double layer in conjunction with the solid electrolyte material and, therefore, can absorb and de-absorb ions rather quickly in comparison to the active electrode material, which reacts electrochemically with the mobile ions and only stores lithium faradaically within its bulk structure. While the capacitor material demonstrates relatively fast rate capabilities compared to the active electrode material, it tends to possess less reversible capacity to store charge. To that end, the discharge kinetics of the capacitor material can enhance the power density of the battery, but the lower charge storage capacity of the capacitor material may restrict energy density. The energy density losses that may be attributed to the capacitor material can, however, be mitigated by a bipolar battery architecture.

The capacitor material is hybridized with the active electrode material and the solid-state electrolyte material of one or both of the electrodes within each unit cell of the bipolar solid-state battery. In particular, and in one embodiment, the solid-state battery includes one or more unit cells in which at least one of the negative electrode (anode on discharge) or the positive electrode (cathode on discharge) includes a mixture of particles that contains active electrode material particles (either active positive or active negative), capacitor material particles, and solid-state electrolyte material particles. In another embodiment, the solid-state battery includes one or more unit cells in which at least one of the negative electrode or the positive electrode includes (i) a base portion containing mixture of particles that comprises active electrode material particles and solid-state electrolyte material particles and (ii) a coating of capacitor material particles over the base portion. In each case, the capacitor material particles supplement the discharge/charge kinetics of the active electrode particles to improve the power performance of the battery.

By employing a bipolar battery architecture and striking the appropriate balance between the fast charging/discharging capacitor material and the higher-capacity active electrode material, as hybridized together, the solid-state battery can deliver high power for short durations over a wide operating window as needed for a variety of high power, low voltage applications. The disclosed bipolar capacitor-assisted solid-state battery is thus a strong candidate to replace the lead-acid battery that has been used for many years as an under-hood start-up battery for a motor vehicle. Other battery applications outside of automotive applications are of course possible as well.

A bipolar capacitor-assisted solid-state battery 10 according to one embodiment of the present disclosure is shown schematically in FIGS. 1-3. The battery 10 includes a plurality electrochemical battery unit cells 12 that are stacked in a stacking dimension 14 oriented normal to a centerplane 15 of the battery 10 that lies parallel to the plane of each cell 12. Each of the electrochemical battery unit cells 12 includes a negative electrode 16, a positive electrode 18, and an electrolyte-containing separator 20 that physically separates and electrically isolates the electrodes 16, 18 from each other while permitting lithium ions to migrate back-and-forth between the electrodes 16, 18. The plurality of electrochemical battery unit cells 12 includes at least a first end unit cell 121 and a second end unit cell 123. And, if additional electrochemical battery unit cells 12 are present, one or more interior unit cells 125 are positioned between the first and second end unit cells 121, 123. Anywhere from one to fifty interior unit cells 125 may be included in the battery 10.

The negative electrode 16, the positive electrode 18, and the separator 20 of each unit cell 12 are in the form of component battery layers that have opposed major faces. The component battery layers are typically rectangularly-shaped layers of consolidated particles that have porosities of, typically, 15% or less, but other geometrical shapes are also possible. The major faces of the battery component layers—which define a thickness of the electrodes 16, 18 and the separator 20—provide the active surface areas of the component battery layers. Indeed, the electrodes 16, 18 and the separator 20 are pressed together and overlap such that the opposed major faces of adjacent battery component layers make interfacial contact with each other, as shown generally in FIG. 1. The negative and positive electrodes 16, 18 are sized to provide a specified capacity while the separator 20 is sized to maintain separation of the electrodes 14, 16. In certain applications, the negative electrode 16 has a thickness ranging from 5 µm to 1000 µm, the positive electrode 18 has a thickness ranging from 5 µm to 1000 µm, and the separator 20 has a thickness ranging from 3 µm to 150 µm.

The plurality of electrochemical battery unit cells 12 are stacked so that the negative and positive electrodes 16, 18 of the several unit cells 12 alternate along the stacking dimension 14 from an outwardly-facing positive electrode 181 of the first unit end cell 121 to an outwardly facing negative electrode 161 of the second end unit cell 123. The negative and positive electrodes 16, 18 within each electrochemical battery cell 12 are separated by the electrically insulating (i.e., non-electrically conductive) separator 20, while the negative and positive electrodes 16, 18 of adjacent electrochemical battery unit cells 12 are separated by a bipolar current collector 22. To that end, the outwardly-facing positive electrode 181 of the first unit end cell 121 and the negative electrode 16 of the same cell 121 are separated by a separator 20, while the negative electrode 16 of the first unit end cell 121 and the positive electrode 18 of the next adjacent unit cell 12 are separated by a bipolar current collector 22, and so on. Each of the bipolar current collectors 22 is electrically insulated from each other by the separator 20 located outward of the negative electrode 16 positioned against one of its major faces and the separator located outward of the positive electrode 18 positioned against the other of its major face.

The electrochemical battery unit cells 12 are stacked between a positive end plate current collector 24 and a negative end plate current collector 26. The positive end plate current collector 24 is interfacially disposed against the outwardly-facing positive electrode 181 of the first unit end cell 121, and, likewise, the negative end plate current collector 26 is interfacially disposed against the outwardly facing negative electrode 161 of the second unit end cell 123. The electrochemical battery unit cells 12 are thus electrically connected to each other in series with the positive end plate current collector 24 and the negative end plate current collector 26 serving as positive and negative terminals, respectively, of the battery 10. The positive end plate current collector 24 and the negative end plate current collector 26 may be electrically connected to an external circuit 28 that routes current through a load device 30. The external circuit 28 may also be electrically connected to a power source 32 that can reverse the current within the battery 10 to increase the voltage of the cells 12 and thereby charge the battery 10.

When the negative electrodes 16 are lithiated and charged, a voltage is established across the negative end plate current collector 24 and the positive end plate current collector 26. This voltage may range from 5 V to 200 V, or more narrowly from 8 V to 20 V when the negative electrodes 16 are fully charged depending on the electrode materials used. The voltage may of course be greater or lesser than this range by increasing or decreasing on the number of interior unit cells 125. To discharge the battery 10 and deliver current to the load device 30, the external circuit 28 is closed, causing the negative electrodes 16 to spontaneously release lithium ions and free electrons. In each cell 12, the released lithium ions migrate through the adjacent separator 20 to the positive electrode 18 within the same electrochemical battery unit cell 12. This migration of lithium ions is represented by arrows 34. The free electrons, however, move in the opposite direction, and are conducted through the adjacent bipolar current collector 22 to the positive electrode 18 of the adjacent electrochemical battery unit cell 12. This conductive movement of the electrons is represented by arrows 36. In this way, the electrons move from one electrochemical battery unit cell 12 to another, while that movement of electrons is balance by the migration of lithium ions in the opposite direction within each of the cells 12 themselves. The electrons that reach the negative end plate current collector 24 are ultimately directed through the external circuit and delivered to the positive end plate current collector 26, as represented by arrows 38, thereby supplying current to the load device 30. The serial connections of the electrochemical unit cells 12 enables the battery 10 to exhibit a high voltage simply by stacking together the appropriate number of cells 12.

Unlike the operation of a monopolar battery architecture—a battery design in which a metal current collector is sandwiched between to electrodes of the same polarity; that is, between two negative electrodes or two positive electrodes—the bipolar configuration of the battery 10 results in electron and lithium ion flow normal to the confronting major faces of the electrodes 16, 18 or, in other words, parallel to the stacking dimension 14, as opposed to in a direction along the planes of the electrodes 16, 18. This results in more uniform current and potential distributions over the major surfaces of the electrodes 16, 18. As a result, the cell-to-cell serial connections exhibit relative low electrical resistance, which minimizes heat generation and associated energy losses. The bipolar battery architecture is thus better able to preserve the power and energy densities of the several electrochemical battery unit cells 12 compared to a prismatic battery architecture, which is particularly helpful here since the inclusion of the capacitor material in the negative and/or positive electrodes 16, 18 of the electrochemical battery unit cells 12 may result in an energy density sacrifice to the battery 10 compared to a scenario in which a capacitor material is not present.

In this particular embodiment of the battery 10, and referring now to FIGS. 2 and 3, the positive electrode 18 of at least one electrochemical battery unit cell 12, and preferably all of the unit cells 12, includes a mixture 40 of active positive electrode material particles 42, solid-state electrolyte material particles 44, and capacitor material particles 46. The mixture 40 of particles may also include electrically conductive diluent particles 48, if desired. The mixture 40 of particles may be bound together by a binder. The positive electrode 18 may comprise anywhere from 40 wt % to 95 wt % of the active positive electrode material particles 42, anywhere from 2 wt % to 40 wt % of the solid-state electrolyte material particles 44, anywhere from 0.1 wt % to 35 wt % of the capacitor material particles 46, anywhere from 1 wt % to 15 wt % of the electrically conductive diluent particles 48, and anywhere from 0.5 wt % to 10 wt % of the binder. The various particles 42, 44, 46, 48 may vary in size to promote efficient packing. Typically, however, the particles 42, 44, 46, 48 have particle sizes, which is a measurement of the largest particle dimension, and an average particle size of the particles 42, 44, 46 may range from 100 nm to 50 µm. Only a few of the capacitor material particles 46 are depicted in FIG. 1 for purposes of indicating the specific electrode(s) that include those particles in this embodiment.

The negative electrode 16 of each electrochemical battery unit cell 12 in this particular embodiment includes a mixture 50 of active negative electrode material particles 52, solid-state electrolyte material particles 54, and electrically conductive diluent particles 56, if desired. The mixture 50 of particles may be bound together by a binder. The negative electrode 16 of each cell 12 may comprises anywhere from 40 wt % to 95 wt % of the active negative electrode material particles 52, anywhere from 0.5 wt % to 50 wt % of the solid-state electrolyte material particles 54, anywhere from 0 wt % to 15 wt % of the conductive diluent particles 56, and anywhere from 0.5 wt % to 10 wt % of the binder. As before, the various particles 52, 54, 56 may vary in size to promote efficient packing, with the particles typically having an average particle size ranging from 100 nm to 50 µm.

The active positive electrode material particles 42 and the active negative electrode particles 52 of the positive electrodes 18 and the negative electrodes 16, respectively, are comprised of an electrochemically active electrode material that can store lithium faradaically. These electrode materials can thus intercalate and deintercalate lithium. The electrode materials of the two types of electrode material particles 42, 52 are formulated to store lithium at different electrochemical potentials relative to a common reference electrode (typically lithium). Specifically, the electrode material of the active negative electrode particles 52 stores intercalated lithium at a lower electrochemical potential (i.e., a higher energy state) than the electrode material of the active positive electrode material particles 42. This electrochemical potential difference may range from 2 V to 5 V. As such, lithium ions can be transferred spontaneously from the active negative electrode particles 52 in the negative electrode 16 to the active positive electrode particles 42 in the positive electrode of each cell 12 (discharge phase). The same lithium ions can also be transferred in the reverse direction within each cell 12 by applying a voltage across the battery 10 that is sufficient to overcome the electrochemical potential difference between the electrode materials of the two types of particles 42, 52 (charge phase).

The electrode material from which the active positive electrode material particles 42 are formed may be a layered lithium transition metal oxide such as lithium cobalt oxide ($LiCoO_2$), a lithium-nickel-manganese-cobalt oxide [$Li(Ni_xMn_yCo_{1-X-Y})O_2$] (where $0<X\leq1$ and $0<Y\leq1$), a lithium-nickel-cobalt-aluminum oxide [$LiNi_{0.8}Co_{0.15}Al_{0.05}O_2$], a lithium-nickel-manganese oxide [$LiNi_XMn_{1-X}O_2$] (where $0<X\leq1$), or $Li_{1+X}MO_2$ (where M comprises Ni, Co, Mn, Cr, Ti, Nb, V, Mg, or Al and $0\leq X\leq0.3$). The electrode material may also be a spinel oxide such as lithium manganese oxide ($LiMn_2O_4$) or a lithium-nickel-manganese oxide [$LiNi_XMn_{2-X}O_4$] (where $0\leq X\leq2$). Still further, the electrode material may be a lithium polyanion such as lithium-vanadium phosphate [$LiV_2(PO_4)_3$], a lithium-iron-manganese phosphate [$LiFe_{1-x}Mn_{2-x}O_4$] (where $0\leq X\leq1$), or a lithium-iron silicate ($Li_2FeSiO_4$). Any of the above listed electrode materials may optionally be doped or coated. Additionally, the positive electrode material particles 42 may all be composed of the same electrode material, including any of the ones listed above, or the particles 42 may include a combination of any two or more of the electrode materials listed above.

The electrode material from which the active negative electrode material particles 52 are formed may be a carbonaceous material such as graphite. The electrode material may also be a spinel lithium titanium oxide $Li_{4+X}Ti_5O_{12}$ ($-1\leq X\leq3$), a metal oxide such as $TiO_2$ and $Li_ATiM_BNb_{2\pm\beta}O_{7\pm o}$ (where $0\leq A\leq5$; $0\leq B\leq0.3$; $0\leq\beta\leq0.3$; $0\leq\sigma\leq0.3$, and M comprises Fe, V, Mo, and Ta), a metal sulfide such as FeS, silicon, a silicon oxide [SiOx] (where $0<X\leq2$), an alloy of silicon with lithium or tin, or tin. The negative electrode material particles 52 may all be composed of the same electrode material, including any of the ones listed above, or the particles 52 may include a combination of any two or more of the electrode materials listed above.

The solid-state electrolyte material particles 44, 54 included within the negative electrodes 16 and the positive electrodes 18 may individually be selected from the same groups of materials. The solid-state electrolyte material from which the particles 44, 54 are formed may be an inorganic solid or a solid polymer that is lithium-ion conductive. The inorganic solid electrolyte material may oxide-based or a sulfide-based and may be an amorphous glassy material, a glass-ceramic material that includes crystalline regions within an amorphous glassy phase, or a crystalline material. The solid polymer, on the other hand, is a polymer material that is swollen with a lithium salt solution (thereby forming a gel) or complexed with a lithium salt to render the polymer lithium ion conductive.

Numerous inorganic solids may be employed as the solid-state electrolyte material. For example, the solid-state electrolyte material may be an oxide-based electrolyte material such as a Garnet-type oxide (e.g., $Li_7La_3Zr_2O_{12}$ or $Li_5La_3M_2O_{12}$ with M=Nb or Ta), a LISICON-type oxide (e.g., $Li_{14}Zn(GeO_4)_4$ or $Li_{3+x}(P_{1-x}Si_x)O_4$ with $0<X<1$), a NASICON-type oxide (e.g., $Li_{1+x}D^{4+}{}_{2-x}D'^{3+}X(PO_4)_3$; where D is at least one of Ti, Ge, Sn, Hf, or Zr; D' is Cr, Al, Ga, Sc, Y, In, or La; and $0 \leq x \leq 2$), a perovskite-type oxide (e.g., $Li_{3.3}La_{0.56}TiO_3$; $Li_{3x}La_{(2/3)-x}TiO_3$ with $0.045 \leq X \leq 0.125$; or $Li_{0.5}M_{0.5}TiO_3$ with M=Sm, Nd, Pr, or La), or an antiperovskite-type oxide (e.g., $Li_3OCl$ or $Li_3OBr$). The solid-state electrolyte material may also be a sulfide-based electrolyte material comprising $Li_2S$—$P_2S_5$, $Li_2S$—$P_2S_5$—$Li_2O$, $Li_2S$—$P_2S_5$—$Li_2O$—$LiI$, $Li_2S$—$P_2S_5$—$LiX$ (X is any of Cl, Br and I), $Li_2S$—$SiS_2$, $Li_2SiS_2$—$LiX$ (X is any of Cl, Br and I), $Li_2S$—$SiS_2$—$B_2S_3$—$LiI$, $Li_2S$—$SiS_2$—$P_2S_5$—$LiI$, $Li_2S$—$B_2S_3$, $Li_2S$—$P_2S_5$—$Z_aS_b$ ("a" and "b" are positive numbers and Z is any of Ge., Zn and Ga.), $Li_2S$-$GeS_2$, $Li_2S$-$Al_2S_3$, $Li_2S$—$As_2S_3$, $Li_2S$—$SiS_2$—$Li_3PO_4$, and $Li_2S$—$SiS_2$—$Li_cMO_d$, ("c" and "d" are positive numbers and M is any of P, As, Sb, Si, Ge, B, Al, Ga and In). The description of "$Li_2S$—$P_2S_5$" signifies the sulfide solid electrolyte material is obtained by using a raw material composition containing $Li_2S$ and $P_2S_5$, and other descriptions signify similarly.

Numerous solid polymers may also be employed as the solid-state electrolyte material. For example, the solid-state electrolyte material may include a polyether-based solid polymer such as poly(ethylene oxide) or poly(ethylene glycol). As another example, the solid-state electrolyte material may include a polyester-based solid polymer such as poly(ethylene carbonate), poly(trimethylene carbonate), or poly(propylene carbonate. Still further, the solid-state electrolyte material may be a nitrile-based solid polymer such as succinonitrile or poly(acrylonitrile), or a polysiloxane. Each of the above-mentioned polymers may be swollen with a lithium salt solution or complexed with a lithium salt. Lithium salts that are used for these applications include one or more of $LiClO_4$, $LiAlCl_4$, $LiI$, $LiBr$, $LiSCN$, $LiBF_4$, $LiB(C_6H_5)_4$, $LiAsF_6$, $LiCF_3SO_3$, $LiN(CF_3SO_2)$, and $LiPF_6$. And, if carried in solution, the solvent may be an organic solvent such as propylene carbonate (PC), ethylene carbonate (EC), dimethylene carbonate (DMC), diethylene carbonate (DEC), ethylene methylene carbonate (EMC), and/or γ-butyrolactone (γ-BL). The solid-state electrolyte material particles 44, 54 may be formed from any one or more of these solid polymers and, in fact, a combination of solid polymers and inorganic solid materials may also be employed.

The electrically conductive diluent particles 48, 56 and binder included within the negative electrodes 16 and the positive electrodes 18 may also be individually selected from the same groups of materials. For example, the electrically conductive diluent particles 48, 56 may be particles of high-surface area carbon black. The carbon black particles may have a surface area that ranges from 10 $m^2$ to 200 $m^2$ and an average particle size that ranges from 10 nm to 2 μm. As for the binder, it may be selected from various resins including polyvinylidene fluoride (PVdF), an ethylene propylene diene monomer (EPDM) rubber, styrene butadiene rubber (SBR), a carboxymethyl cellulose (CMC), polyacrylic acid, or mixtures thereof. The electrically conductive diluent particles 48, 56 and the binder in each electrode 16, 18 may be the same or different.

The capacitor material particles 46 included in the positive electrode(s) 18 of this embodiment of the battery 10 are formed of a supercapacitor material that stores charge electrostatically on its surface, which are otherwise referred to as electric double layer capacitor materials, or it can be formed of a supercapacitor material that stores charge electrostatically on its surface as an electric double layer while also storing charge faradaically through redox charge-transfer interactions with the solid-state electrolyte material particles 44. The latter supercapacitor materials are often termed pseudocapacitor materials. In this application, when the battery 10 is charged, a potential difference of 2 V to 4.3 V typically exists between the electrochemically stored lithium in the active negative electrode material particles 52 of the negative electrode 16 and the lower-energy storage of lithium ions in the supercapacitor material of the capacitor material particles 46 in the positive electrode 18 of the same cell 12. The electric double layer supercapacitor material may be comprised of a carbonaceous material such as activated carbon, graphene, or carbon nanotubes, and the pseudocapacitor material may be comprised of a noble metal oxide such as $RuO_2$, a conducting polymer such as polyaniline (PANT), polypyrrole (PPy), or polythiophene (PTh), a transition metal oxide such as $MnO_2$, $NiO$, $Co_3O_4$, or a metal hydroxide such as $Co(OH)_2$ or $Ni(OH)_2$. Of course, the capacitor material particles 46 may be formed from any one or more of the supercapacitor materials noted above.

The separator 20 is comprised of a lithium-ion-conductive solid electrolyte material equipped compositionally to facilitate lithium ion mobility between the opposed negative and positive electrodes 16, 18 located on opposite sides of the separator 20. In that regard, the separator 20 does not include a free liquid electrolyte that soaks the negative and positive electrodes 16, 18. The lithium-ion-conductive solid electrolyte material may be any of the solid-state electrolyte materials disclosed above in connection with the solid-state electrolyte material particles 44, 54. Indeed, the separator 20 may be a layer of particles that have been consolidated, for example, via cold pressing, yet retain their particle boundaries. In another implementation, however, the separator may be a unitary structure of the lithium-ion-conductive solid electrolyte material as a result of, for example, hot-pressing or calendering, which can reduce the porosity of the separator to 10% or less and cause the particles to merge together in the solid-state through sintering and/or viscoplastic flow. By forming the separator 20 from a solid electrolyte material, and thus avoiding the presence of a free liquid electrolyte between the negative and positive electrodes 16, 18, shunt currents between the opposed electrodes 16, 18 can be avoided, thus allowing the bipolar battery configuration to function efficiently.

The bipolar current collector(s) 22, the positive end plate current collector 24, and the negative end plate current collector 26 may each individually be formed of a metal that is stable within the environment of the battery 10. Preferably, each of the current collectors 22, 24, 26 may be composed of aluminum, nickel, stainless steel, or a cladded metal such as aluminum-cladded copper, nickel-cladded copper, stainless steel-cladded copper, aluminum-cladded nickel, aluminum-cladded stainless steel, or nickel-cladded stainless steel. The current collectors 22, 24, 26 may have the same or different metal compositions and are typically in the form of a foil having a thickness ranging from 3 μm to 20 μm.

The inclusion of the capacitor material particles 46 in the positive electrode(s) 18 along with the overall bipolar battery architecture lowers the impedance of the battery 10 and helps enhance the discharge/charge rate kinetics of the battery 10. Specifically, when the external circuit 28 is closed and the load device 30 demands current flow, as represented by arrow 38 in FIG. 1, lithium ions are deintercalated from the active negative electrode material particles 52 in the negative electrodes 16 of each electrochemical battery unit cell 12. The lithium ions migrate through the negative electrodes 16 by way of the solid-state electrolyte material particles 54 and eventually through the separator 20 of each unit cell 12 as represented by arrows 34. The lithium ions arrive in the positive electrodes 18 and are quickly adsorbed electrostatically onto, and also faradaically reacted with, depending on the composition of the supercapacitor material, the capacitor material particles 46, which are present within at least one and preferably all of the positive electrodes 18, while at the same time being intercalated into the higher-capacity active positive electrode material particles 42 at a slower rate. The enhanced rate of lithium ion uptake by the capacitor material particles 46 causes a corresponding increase in electron flow into the positive electrodes 18 from the adjacent unit cell 12 through the bipolar current collector 22, as represented by arrows 36, to balance the flow of lithium ions. The result of this decrease in battery impedance and improved discharge kinetics is better power performance of the battery 10.

The bipolar capacitor-assisted solid-state battery 10 set forth in FIGS. 1-3 is not the only way that a capacitor material may be introduced into the battery consistent with the spirit and objectives of the present disclosure. Other embodiments are shown, for example, in FIGS. 4-8. In the following discussion of the alternate embodiments, reference numerals that correspond to the reference numerals used in the description of the previous embodiment will be used to identify the same or similar elements having the same or similar functionality, even if not all of the reference numerals are discussed in further detail. To that end, the description of aspects of the previously-described embodiment shown in FIGS. 1-3 apply equally to aspects of the following embodiments that are identified with corresponding reference numerals unless specifically described otherwise. Moreover, for purposes of visual simplicity, only a few of the electrode material particles, solid-state electrolyte material particles, electrically-conductive diluent particles, and capacitor materials particles are shown distinctly in FIGS. 4-8. It should be understood that the hatched portion of the negative and positive electrodes 16, 18, 116, 118, 216, 218 that accounts for the remainder of the electrodes 16, 18, 116, 118, 216, 218 is meant to represent a combination of the relevant particles consistent with how the electrodes are depicted in FIGS. 2-3.

Figure 4:
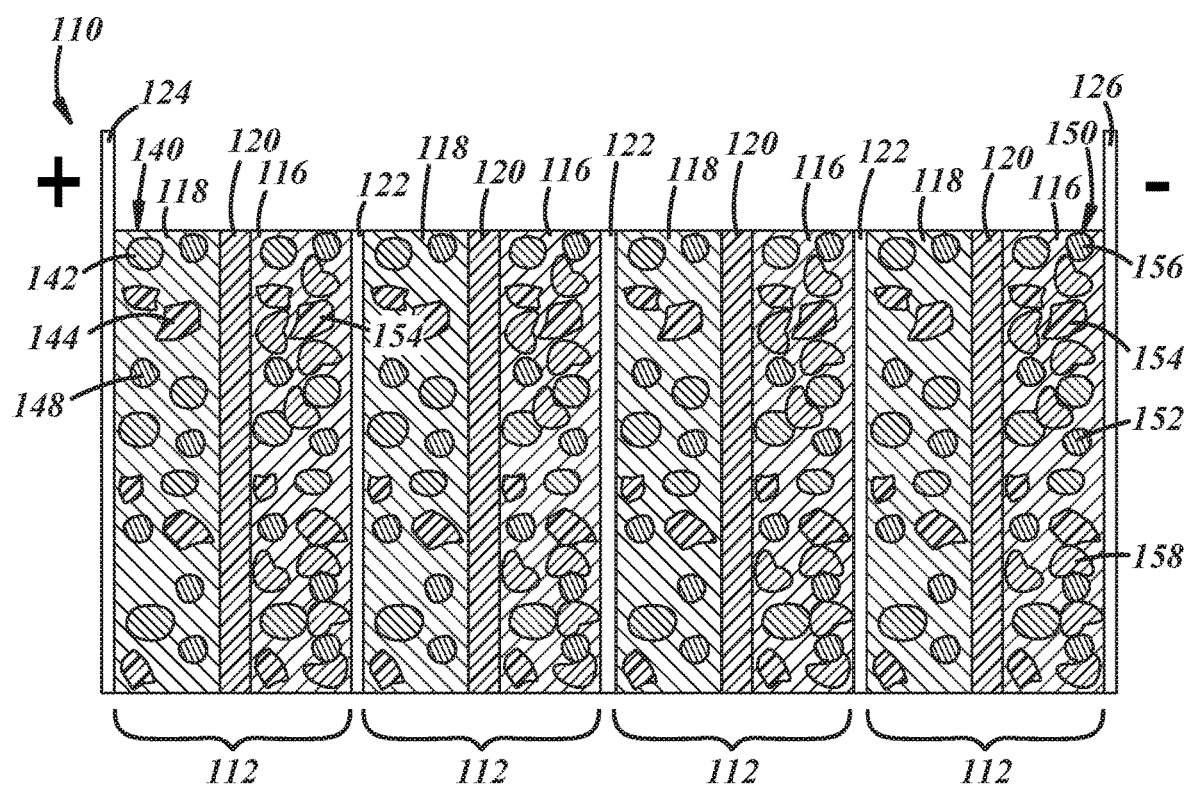
FIG. 4 is an idealized cross-sectional view of a bipolar capacitor-assisted solid-state battery according to another embodiment of the present disclosure.

Referring now to FIG. 4, a bipolar capacitor-assisted solid-state battery 110 according to another embodiment of the present disclosure is shown. Here, the negative electrode 116 of at least one electrochemical battery unit cell 112, and preferably all of the cells 112, includes a mixture 150 of active negative electrode material particles 152, solid-state electrolyte material particles 154, electrically conductive diluent particles 156, and capacitor material particles 158, plus a binder. The active negative electrode material particles 152, the solid-state electrolyte material particles 154, and the electrically conductive diluent particles 156 are the same as before. The capacitor material particles 158 in this embodiment may also be comprised of the same supercapacitor materials described above in connection with the capacitor material particles 46 of the positive electrode(s) 18 in FIGS. 1-3. The positive electrode 118 of each unit cell 112 may be the same as before except that it lacks capacitor material particles. In this battery 110, lithium ions are quickly desorbed from the capacitor material particles 158 during cell discharge to decrease battery impedance and improve the discharge kinetics of the battery 110.

Figure 5:
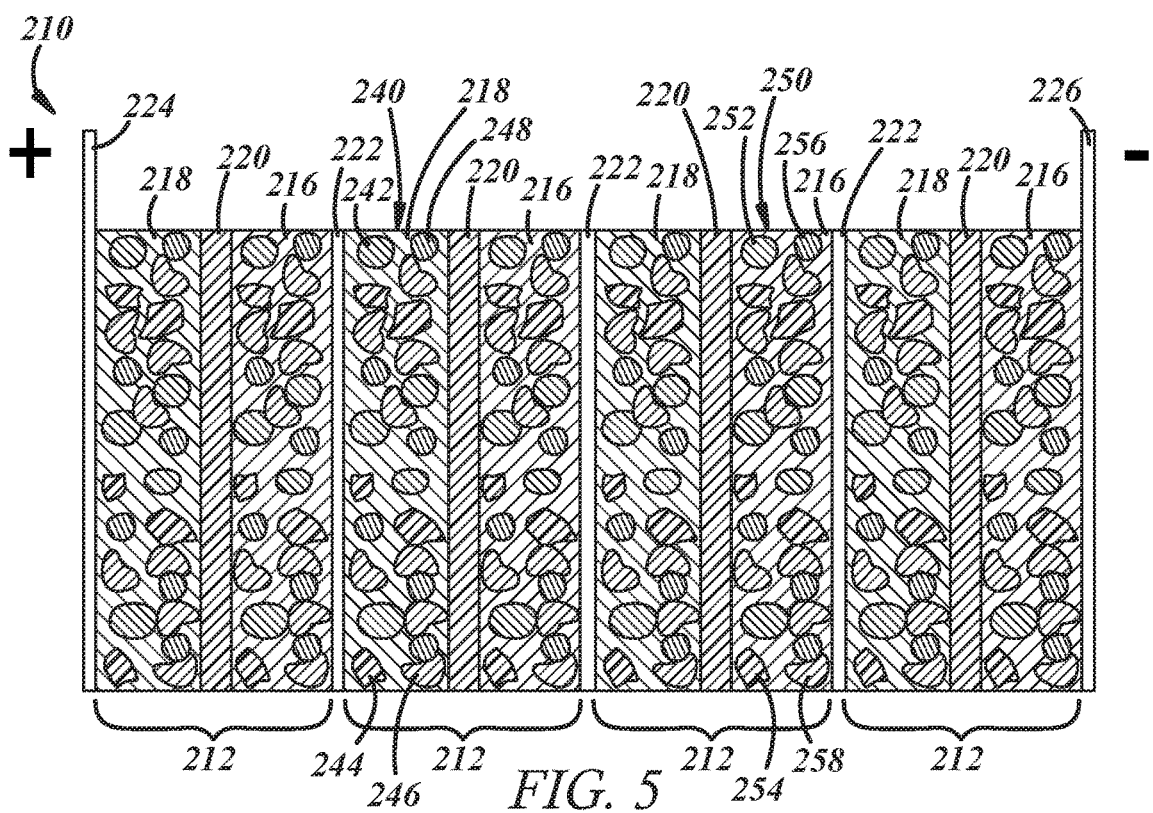
FIG. 5 is an idealized cross-sectional view of a bipolar capacitor-assisted solid-state battery according to yet another embodiment of the present disclosure.

Referring now to FIG. 5, a bipolar capacitor-assisted solid-state battery 210 according to another embodiment of the present disclosure is shown. In this embodiment, the negative electrode 216 of at least one electrochemical battery unit cell 212, and preferably all of the cells 212, includes a mixture 250 of active negative electrode material particles 252, solid-state electrolyte material particles 254, electrically conductive diluent particles 256, and capacitor material particles 258, plus a binder. Likewise, the positive electrode 218 of at least one electrochemical battery unit cell 212, and preferably all of the cells 212, includes a mixture 240 of active positive electrode material particles 242, solid-state electrolyte material particles 244, capacitor material particles 246, and electrically conductive diluent particles 248, plus a binder. The particles 252, 254, 256, 258 of the negative electrode(s) 216 are the same as the previous embodiment discussed in connection with FIG. 4 and the particles 242, 244, 246, 248 of the positive electrode(s) 218 are the same as the previous embodiment discussed in connection with FIGS. 1-3. The battery 210 in this embodiment would quickly desorb and adsorb lithium ions during cell discharge and cell charge in both the negative and positive electrodes 216, 218 to decrease in battery impedance and improve the discharge kinetics of the battery 210.

Figure 6:
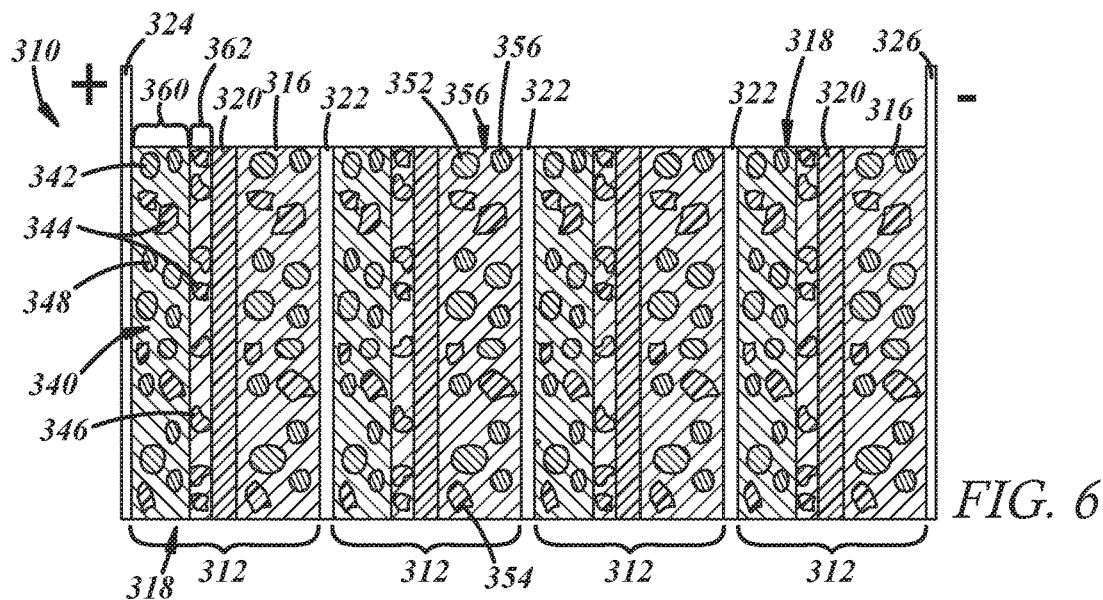
FIG. 6 is an idealized cross-sectional view of a bipolar capacitor-assisted solid-state battery according to still another embodiment of the present disclosure.
Figure 7:
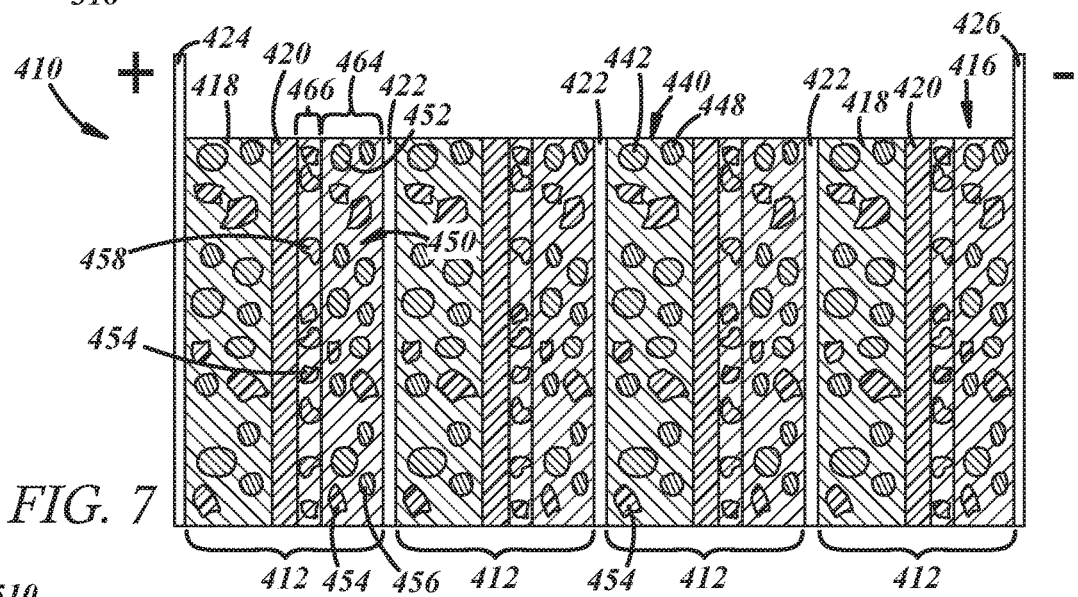
FIG. 7 is an idealized cross-sectional view of a bipolar capacitor-assisted solid-state battery according to yet another embodiment of the present disclosure.
Figure 8:
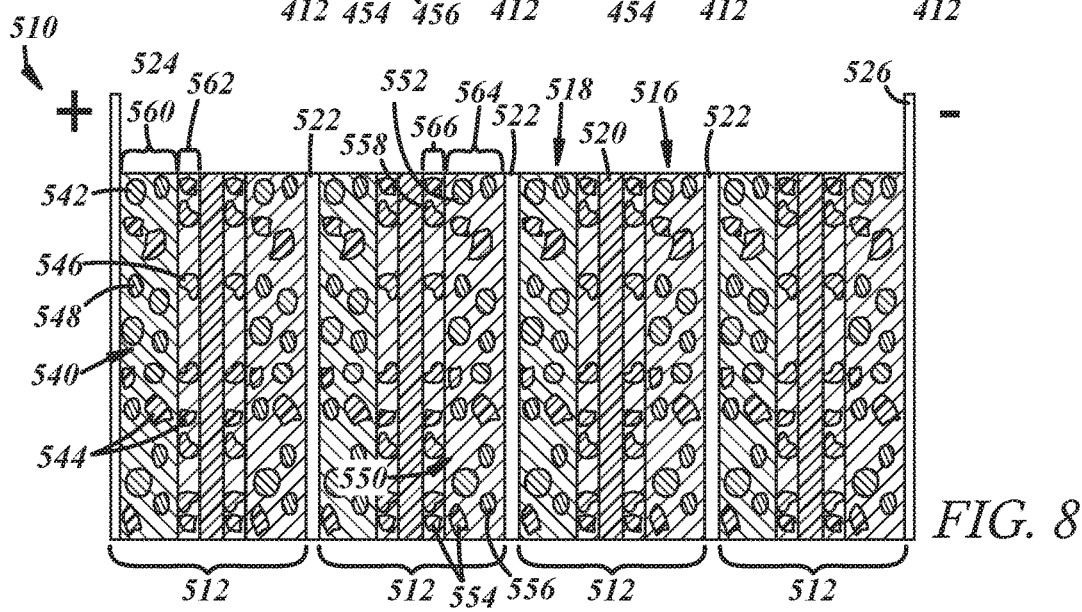
FIG. 8 is a cross-sectional view of a bipolar capacitor assisted solid-state battery according to still another embodiment of the present disclosure.

FIGS. 6-8 illustrate other embodiments of bipolar capacitor-assisted solid-state batteries 310, 410, 510 according to the present disclosure. The batteries shown in FIGS. 6-8 are different from the batteries 10, 110, 210 shown in FIGS. 1-5 in that the capacitor material is included in the batteries 310, 410, 510 as a distinct coating layer that forms part of one or both of the electrodes. For example, and referring now to FIG. 6, the positive electrode 316 of at least one electrochemical battery unit cell 312, and preferably all of the cells 312, includes a base portion 360 that comprises a mixture 340 of active positive electrode material particles 342, solid-state electrolyte material particles 344, and electrically conductive diluent particles 348, plus a binder, similar to the embodiment of FIG. 4. The positive electrode 316 of the cell(s) 312 further includes a coating 362 that comprises capacitor material particles 346, solid-state electrolyte material particles 354, and a binder. The coating 362 overlies the base portion 360 and is disposed between the base portion 360 and the separator 320 of the cell 312. In that regard, the coating 362 that contains the capacitor material particles 346 makes interfacial contact with the base portion 360 on one of its major faces and the separator 320 on its other major face. The capacitor material particles 346 included in the coating 362 may be comprised of any of the supercapacitor materials mentioned above in connection with the capacitor material particles 46 included in the positive electrode(s) 18 of the battery 10 shown in FIGS. 1-3.

The negative electrode 316 of each electrochemical battery unit cell 312 may be the same as the negative electrodes 16 of the battery 10 described above in connection with FIGS. 1-3; that is, each of the negative electrodes 316 includes a mixture 350 of active negative electrode material particles 352, solid-state electrolyte material particles 354, and electrically conductive diluent particles 356, plus a binder. The bipolar capacitor-assisted solid-state battery 310 of this embodiment thus functions similarly to the battery 10 described in connection with FIGS. 1-3. The fact that the capacitor material particles 346 of the positive electrode(s) 318 are segregated into a distinct coating 362—as opposed to being intermixed with the solid-state electrolyte material particles 344 and the active positive electrode material particles 342—can have a slight effect on how the lithium ions are stored compared to the battery 10 of the previous embodiment. In particular, the lithium ions migrate through the negative electrodes 316 by way of the solid-state electrolyte material particles 354 and eventually through the separator 320. The lithium ions firstly arrive at the overlying coating 362 of the positive electrode 318 and are quickly adsorbed electrostatically onto, and are possibly faradaically reacted with, the capacitor material particles 346 contained in the coating 362. The lithium ions then further migrate to the base portion 360 of the positive electrode 318 through the solid-state electrolyte particles 354 in the coating 362 and are intercalated into the higher-capacity active positive electrode material particles 342 at a slower rate. A corresponding increase in electron flow into the positive electrodes 318 from the adjacent unit cell 312 results through the bipolar current collector 322 to balance the flow of lithium ions.

Referring now to FIG. 7, a bipolar capacitor-assisted solid-state battery 410 according to another embodiment of the present disclosure is shown. In this embodiment of the battery 410, the negative electrode 416 of at least one electrochemical battery unit cell 412, and preferably all of the cells 412, includes a base portion 464 that comprises a mixture 450 of active negative electrode material particles 452, solid-state electrolyte material particles 454, and electrically conductive diluent particles 456, plus a binder, similar to the embodiment of FIGS. 1-3. The negative electrode 416 of the cell(s) 412 further includes a coating 466 that comprises capacitor material particles 458, solid-state electrolyte material particles 454, and a binder. The coating 466 overlies the base portion 464 and is disposed between the base portion 464 and the separator 420 of the cell 412. In that regard, the coating 466 that includes the capacitor material particles 458 makes interfacial contact with the base layer 464 on one of its major faces and the separator 420 on its other major face. The capacitor material particles 458 included in the coating 464 may be comprised of any of the supercapacitor materials mentioned above in connection with the capacitor material particles 158 included in the negative electrode(s) 116 of the battery 110 shown in FIG. 4.

The positive electrode 418 of each electrochemical battery unit cell 412 may be the same as the positive electrodes 118 of the battery 110 described above in connection with FIG. 4. Consequently, the bipolar capacitor-assisted solid-state battery 310 of this embodiment functions similarly to the battery 110 described in connection with FIG. 4. The fact that the capacitor material particles 458 of the negative electrode(s) 416 are segregated into a distinct coating 466 can have a slight effect on how the lithium ions are stored compared to the battery 110 of the previous embodiment. In particular, during discharge of the battery 410, the lithium ions migrate are quickly released from the capacitor material particles 458 included in the coatings 466 of the negative electrodes 416, while lithium ions stored in the active negative electrode material particles 452 are released at a slower rate. The lithium ions migrate through the solid-state electrolyte particles 454 included in the coating 466 of the negative electrodes 416 and are eventually delivered to the positive electrodes 418 through the separator 420. The increased rate at which the lithium ions are released from the capacitor material particles 458 decreases battery impedance.

Referring now to FIG. 8, a bipolar capacitor-assisted solid-state battery 510 according to another embodiment of the present disclosure is shown. In this embodiment, the negative electrode 516 of at least one electrochemical battery unit cell 512, and preferably all of the cells 512, includes a base portion 564 and a coating 566. The base portion 564 comprises a mixture 550 of active positive electrode material particles 552, solid-state electrolyte material particles 554, and electrically conductive diluent particles 556, plus a binder, and the coating 566 comprises capacitor material particles 558 and solid-state electrolyte material particles 554. Each of the base portion 564 and the coating 566 is constructed in the same way as described above in connection with the negative electrode 416 of at least one of the unit cells 412 in the battery 410 shown in FIG. 7. Likewise, the positive electrode 518 of at least one electrochemical battery unit cell 512, and preferably all of the cells 512, includes a base portion 560 and a coating 562. The base portion 560 comprises a mixture 540 of active positive electrode material particles 542, solid-state electrolyte material particles 544, and electrically conductive diluent particles 548, plus a binder, and the coating 562 comprises capacitor material particles 546 and solid-state electrolyte material particles 544. Each of the base portion 560 and the coating 562 is constructed in the same way as described above in connection with the positive electrode 318 of at least one of the cells 312 in the battery 310 shown in FIG. 6. The battery 510 in this embodiment, as before, would quickly desorb and adsorb lithium ions during cell discharge and cell charge in both the negative and positive electrodes 516, 518.

Figure 9:
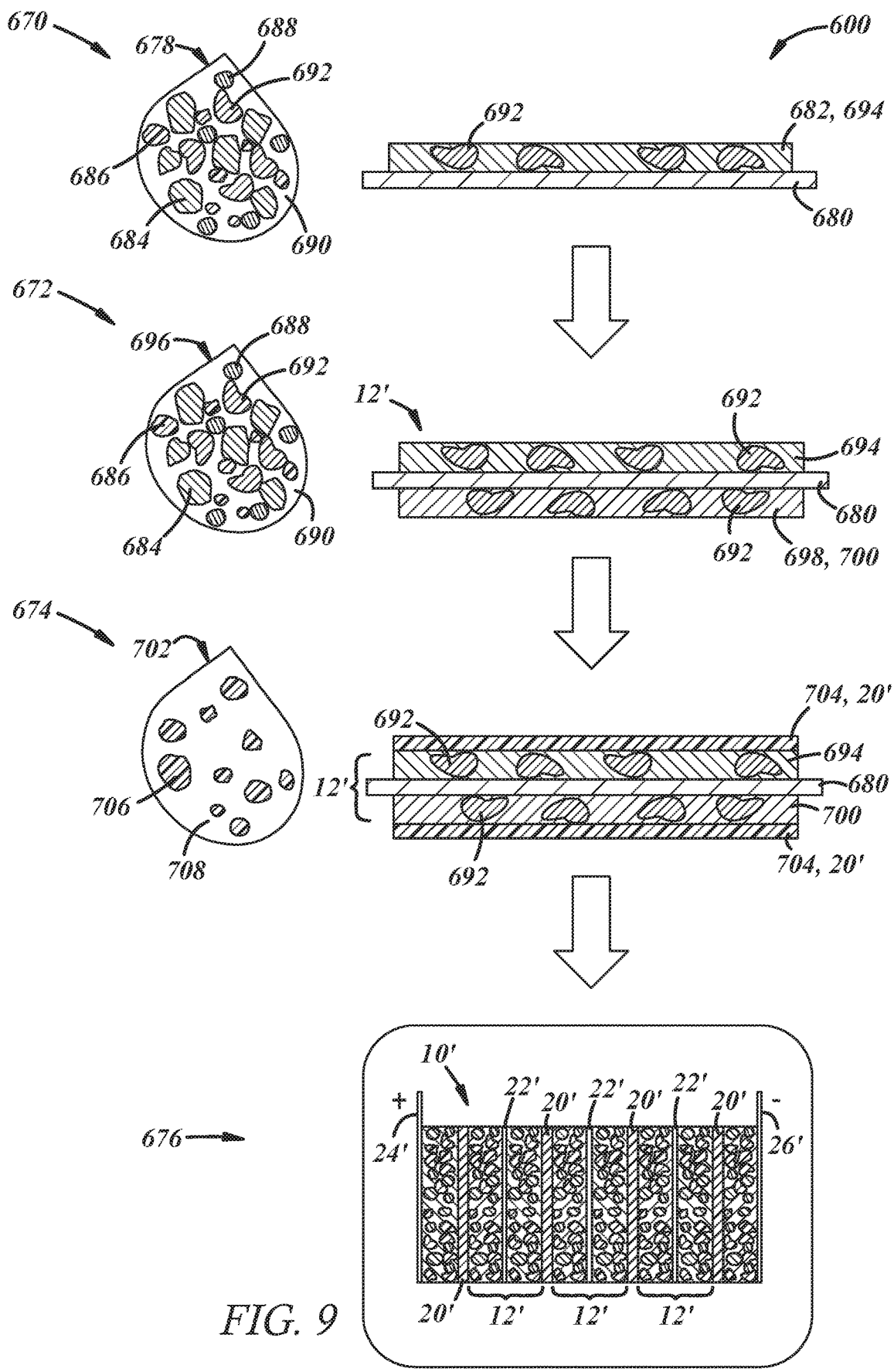
FIG. 9 is a schematic illustration of a method for making a bipolar capacitor-assisted solid-state battery according to various embodiments of the present disclosure.

The various embodiments of the bipolar capacitor-assisted solid-state battery 10, 110, 210, 310, 410, 510 described above may be manufactured by a slurry coating process 600 as illustrated in FIG. 9. The slurry process 600 involves a first electrode forming step 670, a second electrolyte forming step 672, a separator forming step 674, and a cell assembly step 676. These steps 670, 672, 674, 676 may be tailored to the particular embodiment of the battery 110, 210, 310, 410, 510 being manufactured to a large extent by specifying the compositions of the various slurries. Several iterations of the slurry coating process 600 are further described below including implementations specific to the batteries 10, 110, 210 in which the capacitor material particles 46, 158, 246, 258 are intermingled with active electrode material particles 42, 152, 242, 252 and batteries 310, 410, 510 in which the capacitor material particles 346, 458, 546, 558 are confined to a discrete coating 362, 466, 562, 566.

For each of the batteries 10, 110, 210 (collectively 10' even though, here, the battery 210 of FIG. 5 is shown for demonstrative purposes) in which capacitor material particles are intermingled with active electrode material particles, the first electrode forming step 670 involves forming a first electrode slurry composition 678 and then depositing that composition 678 onto a current collector 680 as a first electrode precursor layer 682. The first electrode slurry composition 678 includes active electrode material particles 684, solid-state electrolyte material particles 686, electrically conductive diluent particles 688, a binder, and a solvent 690. The first electrode slurry composition 678 may also include capacitor material particles 692 depending on whether those particles are intended to be contained in the electrode being formed along with the other particles 684, 686, 688. The current collector 680 onto which the first electrode slurry composition 678 is deposited is a bipolar current collector 22.

The active electrode material particles 684 included in the first slurry composition 678 may be active negative electrode material particles or active positive electrode material particles. If active negative electrode material particles are present, the active electrode material particles 684 may be any one or more of the active negative electrode material particles 52 described above in connection with the battery 10 depicted in FIGS. 1-3. On the other hand, if active positive electrode material particles are present, the active electrode material particles 684 may be any one or more of the active positive electrode material particles 42 described above in connection with the battery 10 depicted in FIGS. 1-3. The solid-state electrolyte material particles 686 and the electrically conductive diluent particles 688 may be any one or more of the solid-state electrolyte material particles 44, 54 described above and any of the electrically conductive diluent particles 48, 56 described above, respectively, in connection with the battery 10 depicted in FIGS. 1-3, and the solvent 690 may be any suitable solvent including, but not limited to, N-methyl-2-pyrrolidone (NMP) or dimethyl sulfoxide (DMSO). The capacitor material particles 692, if present, may be any of the supercapacitor material particles 46, 158 described above including the recited electrode double layer and/or the pseudocapacitor materials.

The first slurry composition 678, once prepared, is deposited into the current collector 680 by tape casting or any other suitable thin-film deposition technique. Tape casting involves applying the slurry composition 678 to a flat surface of the current collector 680 and spreading the applied slurry to the desired thickness and width using a doctor blade. In a typical application of tape casting, the current collector 680 is pulled along a support table through a slurry box that houses the first slurry composition 678. The doctor blade is affixed to the exit wall of the slurry box so that the current collector 680 exits the slurry box with the first electrode precursor layer 682 deposited on its upward-facing and uncovered surface. After being deposited, the first electrode precursor layer 682 is dried to remove the solvent and thereby produce a first electrode 694, which may be either a negative electrode 16, 116, 216 or a positive electrode 18, 118, 218 depending on the composition of the active electrode material particles 684, albeit in a non-consolidated state. The drying of first electrode precursor layer 682 may occur unassisted in static air at room temperature (i.e., 25° C.) or, in an alternate implementation, the evaporation rate of the solvent may be accelerated with the aid of air blowers, a subatmospheric environment, and/or moderate heat provided, for example, by a series of heat lamps through which the precursor layer is progressed.

The second electrode forming step 672 is similar to the first electrode forming step 670 except that it involves forming a second electrode slurry composition 696 and then depositing that composition 696 onto the current collector 680 on the opposite side of the first electrode 694 as a second electrode precursor layer 698. The second electrode slurry composition 696 is generally the same as the first electrode slurry composition 678 in that it includes active electrode material particles 684, solid-state electrolyte material particles 686, electrically conductive diluent particles 688, a binder, and a solvent 690. The second electrode slurry composition 696 may also include capacitor material particles 692 depending on whether those particles are intended to be contained in the electrode being formed along with the other particles 684, 686, 688. The active electrode material particles 684 included in the second electrode slurry composition 696 are the opposite of those included in the first electrode slurry composition 678; that is, if the active electrode material particles 684 in the first electrode slurry composition 678 are active negative electrode particles, the active electrode material particles 684 in the second electrode slurry composition 696 are active positive electrode material particles, and vice versa.

The second electrode slurry composition 696 may be deposited onto the current collector 680 and dried to remove the solvent and thereby produce a second electrode 700, which may be either a negative electrode 16, 116, 216 or a positive electrode 18, 118, 218 depending on the composition of the active electrode material particles 684, yet opposite from that of the first electrode 694 formed form the first electrode slurry composition 678, albeit in a non-consolidated state. The second electrode slurry composition 696 may be deposited and dried in the same manner as the first electrode slurry composition 678. At this point, two electrodes 694, 700 have been formed onto the current collector 680, thus providing what is oftentimes referred to as a bipolar electrode 12'.

The separator forming step 674 involves forming a separator slurry composition 702 and then depositing that composition 702 as a separator precursor layer 704 onto either or both of the electrodes 694, 700, each of which is already supported on the current collector 680. Here, the separator slurry composition 702 is shown being deposited on both electrodes 694, 700 although it should be understood that the composition 702 may be deposited on only the first electrode 694 or only the second electrode 700 in other embodiments. The separator slurry composition 702 includes solid-state electrolyte material particles 706 and a solvent 708. The solid-state electrolyte material particles 706 may be any one or more of the solid-state electrolyte material particles 44, 54 described above in connection with the battery 10 depicted in FIGS. 1-3, and the solvent 708 may again be any suitable solvent including, but not limited to, NMP or DMSO. The separator slurry composition 702 is deposited onto the electrode(s) 694, 700 by tape casting or any other suitable thin-film deposition technique, followed by drying the separator precursor layer 704 to remove the solvent and thereby produce a solid-state separator 20, 120, 220 as described above or a portion thereof (collectively 20'), albeit in a non-consolidated state.

The bipolar electrode 12' with a separator 20' overlying at least one of the first or second electrodes 694, 700, and in some instances both, may then be consolidated to compress the electrodes 694, 700 and the separator(s) 20' to decrease their respective porosities, typically to 15% or less, while the battery component layers 694, 700, 20' are supported on the current collector 680. Such consolidation may be performed by cold-pressing, hot-pressing, or calendering, among other options. Additional bipolar electrodes 12' with a supported separator 20' on one or both sides may be formed by repeating the first electrode forming step 670, the second electrode forming step 672, and the separator forming step 674, as described above, followed by consolidation. And while the various steps 670, 672, 674 have been described as being performed in a certain order, such an order is not necessarily required. For instance, the first electrode 694 may be formed on the current collector 680 followed by, first, forming a separator 20' over the first electrode 694 and, second, forming the second electrode 700 on the other side of the current collector 680, and then finally forming another separator 20' over the second electrode 700, if desired.

After a plurality of the bipolar electrodes 12' have been formed in a consolidated state, and during the cell assembly step 676, the bipolar electrodes 12' are stacked together and assembled into the bipolar capacitor-assisted solid-state battery 10'. Preferably, the bipolar electrodes 12' are stacked serially between an end plate current collector 24, 124, 224 (collectively 24') that carries one of a negative electrode or a positive electrode and another end plate current collector 26, 126, 226 (collectively 26') that carries the other of a negative electrode or a positive electrode. This ensures that each of the current collectors 680 serving as a bipolar current collector 22 is disposed interfacially against a first electrode 694 (positive or negative) on one side and a second electrode 700 (positive or negative yet opposite from that of the first electrode 694) on the other side. A separator 20' may overlie either or both of the electrodes carried on the end plate current collectors 24', 26' if needed to separate the electrode carried on the end plate 24', 26' from the electrode 694, 700 of the adjacent bipolar electrode 12' in the stack. The end plate current collectors 24', 26' and the electrodes carried thereon may be formed from the relevant electrode and separator forming steps described above.

Figure 10:
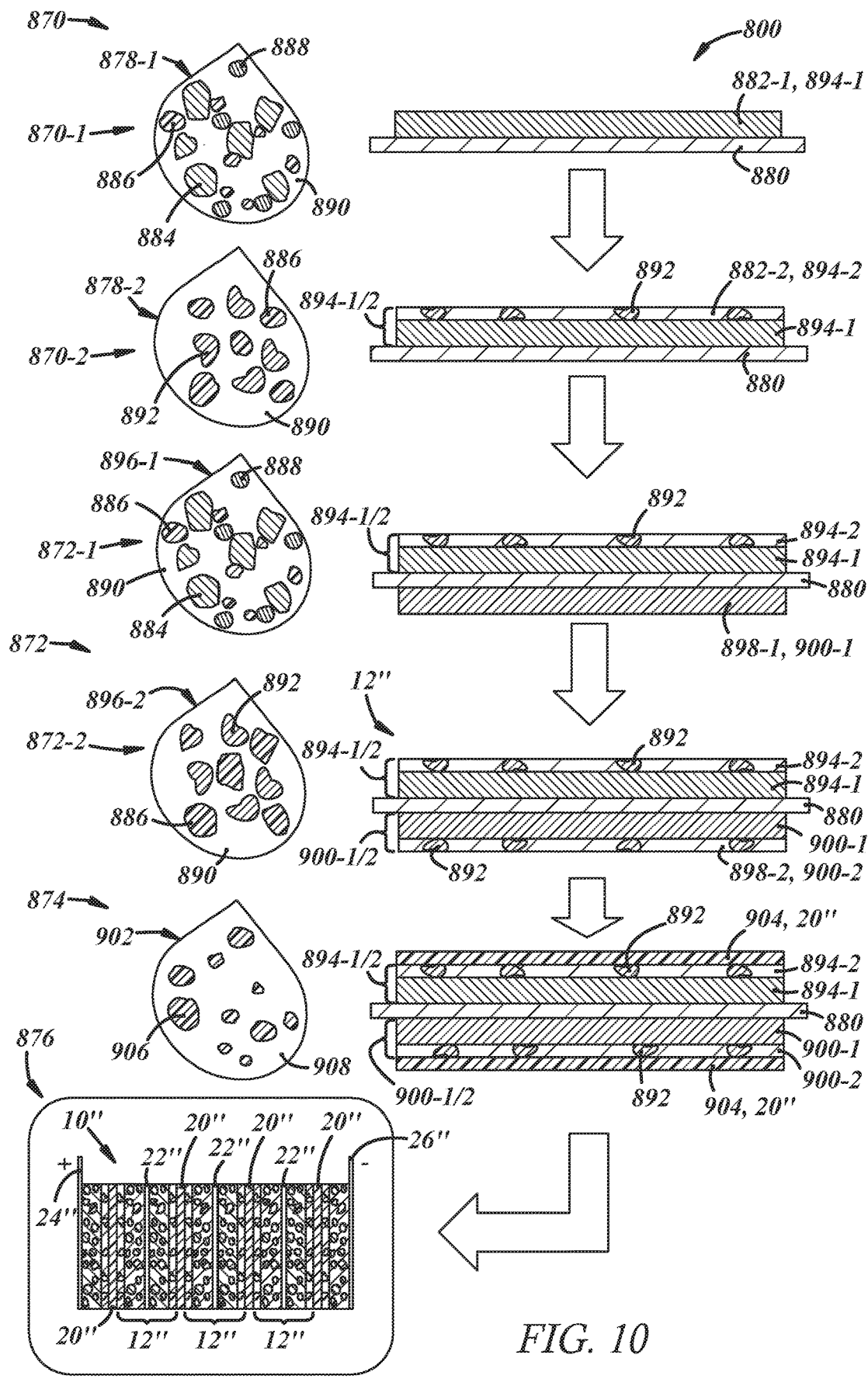
FIG. 10 is a schematic illustration of another method for making a bipolar capacitor-assisted solid-state battery according to various embodiments of the present disclosure.

As depicted in FIG. 10, the slurry coating process may be modified slightly from that described above to manufacture the batteries 310, 410, 510 (collectively 10" even though, here, the battery 510 of FIG. 8 is shown for demonstrative purposes) in which the capacitor material particles 346, 458, 546, 558 are confined to a discrete coating 362, 466, 562, 566. The slurry coating process is identified here by reference numeral 800. Essentially, the first electrode forming step 870 may be the same as the first electrode forming step 670 of the previous implementation, except that no capacitor material particles are present, to form a first electrode 894, or it may include two sub-steps: a base layer forming step 870-1 and a coating step 870-2. The base layer forming step 870-1 involves forming a first electrode slurry composition 878-1 and then depositing that composition 878-1 onto a current collector 880 as a first electrode precursor base layer 882-1. The first electrode slurry composition 878-1 includes active electrode material particles 884, solid-state electrolyte material particles 886, electrically conductive diluent particles 888, a binder, and a solvent 890. These components of the first electrode slurry composition 878-1 of this implementation of the slurry coating process 800 are the same as those of the previous implementation of the slurry coating process 600 described in connection with FIG. 9.

The first electrode slurry composition 878-1 is deposited onto the current collector 880 and dried to remove the solvent and thereby produce a first electrode base portion 894-1, which may be either a base portion 464, 564 of a negative electrode 416, 516 or a base portion 360, 560 of a positive electrode 318, 518 depending on the composition of the active electrode material particles 884, albeit in a non-consolidated state. The first electrode slurry composition 878-1 may be deposited and dried in the same manner as the first electrode slurry composition 678 of the previous implementation of the slurry coating process 600.

After the electrode base portion 894-1 has been formed, the coating step 870-2 is carried out. In the coating step 870-2, a coating slurry composition 878-2 is prepared that includes capacitor material particles 892, solid-state electrolyte material particles 886, and a solvent 890. Each of the capacitor material particles 892, the solid-state electrolyte material particles 886, and a solvent 890 may be the same as described above including the recited electrode double layer and/or the pseudocapacitor materials. The coating slurry composition 878-2 may be deposited onto the electrode base portion 894-1 as a first coating precursor layer 882-2. The first coating precursor layer 882-2 is then dried to remove the solvent and thereby produce a coating 894-2 that includes capacitor material particles 892 and solid-state electrolyte material particles 886 (not shown in the deposited layer), albeit in a non-consolidated state. The coating slurry composition 878-2 may be deposited and dried in the same manner as the first electrode slurry composition 878-1. At this point, the electrode base portion 894-1 and the coating 894-2 together (abbreviated 894-1/2) constitute either the negative electrode 416, 516 or the positive electrode 318, 518 described in connection with FIGS. 6-8.

Following the first electrode forming step 870, the second electrode forming step 872 is performed. The second electrode forming step 872 is similar to the first electrode forming step 870 in that it forms a second electrode 900 or 900-1/2 onto the current collector 880 on the opposite side of the first electrode 894 or 894-1/2. The second electrode 900 may be formed as described above in the second electrode forming step 672 of the slurry coating process 600 of FIG. 9, except that no capacitor material particles are present, or the second electrode 900-1/2 may be formed by carrying out two sub-steps: a base layer forming step 872-1 and a coating step 872-2. In the base layer forming step 872-1, a second electrode slurry composition 896-1 is deposited onto the current collector 880 as a second electrode precursor base layer 898-1. The second electrode slurry composition 896-1 includes active electrode material particles 884, solid-state electrolyte material particles 886, electrically conductive diluent particles 888, a binder, and a solvent 890. These components of the second electrode slurry composition 896-1 of this implementation of the slurry coating process 800 are the same as those of the previous implementation of the slurry coating process 600 described in connection with FIG. 9. The second electrode precursor base layer 898-1 is then dried to remove the solvent, thereby producing an electrode base portion 900-1, which may be either a base portion 464, 564 of a negative electrode 416, 516 or a base portion 360, 560 of a positive electrode 318, 518 so long as it is opposite from that of the first electrode 894 or 894-1/2, albeit in a non-consolidated state. A bipolar electrode (collectively 12") is thus formed. The second electrode slurry composition 896-1 may be deposited and dried in the same manner as the second electrode slurry composition 696 of the slurry coating process 600 described above.

The coating step 872-2 involves forming a coating slurry composition 896-2 that includes capacitor material particles 892, solid-state electrolyte material particles 886, and a solvent 890. Each of the capacitor material particles 892, the solid-state electrolyte material particles 886, and a solvent 890 may be the same as described above including the recited electrode double layer and/or the pseudocapacitor materials. The coating slurry composition 896-2 may be deposited onto the electrode base portion 900-1 as a second coating precursor base layer 898-2. The second coating precursor layer 898-2 is then dried to remove the solvent, thereby producing a coating 900-2 that includes capacitor material particles 892 and solid-state electrolyte material particles 884 (not shown in the deposited layer), albeit in a non-consolidated state. The coating slurry composition 896-2 may be deposited and dried in the same manner as the coating slurry composition 878-2 described above. The electrode base portion 900-1 and the coating 900-2 together (abbreviated 900-1/2) constitute either the negative electrode 416, 516 or the positive electrode 318, 518—whichever is opposite that of the other electrode 894 or 894-1/2—described in connection with FIGS. 6-8

Next, the separator forming step 874 is performed, which involves forming a separator slurry composition 902 and then depositing that composition 902 as a separator precursor layer 904 onto either or both of the electrodes 894 or 894-1/2, 900 or 900-1/2, each of which is already supported on the current collector 880. Here, the separator slurry composition 902 is shown being deposited on both electrodes 894-1/2, 900 or 900-1/2 (each of which includes a base portion and a coating) although it should be understood that the composition 902 may be deposited on only the first electrode 894 or 894-1/2 or only the second electrode 900 or 900-1/2 in other embodiments. The separator slurry composition 902 includes solid-state electrolyte material particles 906 and a solvent 908, and the deposition and drying of this composition 902 is performed in the same way as described above in connection with the separator forming step 674 of the slurry coating process 600 depicted in FIG. 9 to produce a separator 320, 420, 520 or a portion thereof (collectively 20").

At this point, the bipolar electrode 12" that includes two electrodes 894 or 894-1/2, 900 or 900-1/2—one on each side of the current collector 880—along with a separator 20' overlying at least one of the first or second electrodes 894 or 894-1/2, 900 or 900-1/2, and in some instances both, is provided. The bipolar electrode 12" may then be consolidated as previously described to compress the electrodes 894 or 894-1/2, 900 or 900-1/2 and the separator(s) 20" to decrease their respective porosities, typically to 15% or less, while the battery component layers 894 or 894-1/2, 900 or 900-1/2, 20' are supported on the current collector 880. Additional bipolar electrodes 12" with a separator 20" on one or both sides may be formed by repeating the first electrode forming step 870, the second electrode forming step 872, and the separator forming step 874 as described above, followed by consolidation. After a plurality of the bipolar electrodes 12" have been formed in a consolidated state, and during the cell assembly step 876, the bipolar electrodes 12" are stacked together and assembled into the bipolar capacitor-assisted solid-state battery 10" consistent with the approached detailed above for the cell assembly step 676 of the previous implementation of the slurry coating process 600 described above in connection with FIG. 9.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A bipolar capacitor-assisted solid-state battery comprising:
a negative end plate current collector;
a positive end plate current collector;
a plurality of electrochemical battery unit cells positioned between the negative end plate current collector and the positive end plate current collector,
wherein each of the electrochemical battery unit cells including a negative electrode, a positive electrode, and a lithium ion-conductive electrolyte-containing separator disposed between the negative electrode and the positive electrode,
wherein the lithium ion-conductive electrolyte-containing separator of each electrochemical battery unit cell comprises a first solid-state electrolyte material and does not include a free liquid electrolyte,
wherein at least one negative electrode of the electrochemical battery unit cells or at least one positive electrode of the electrochemical battery unit cells includes a capacitor coating comprising a capacitor material and a second solid-state electrolyte material, and
wherein the capacitor material is a pseudocapacitor material selected from the group consisting of: $RuO_2$, $MnO_2$, $NiO$, $Co_3O_4$, $Co(OH)_2$, $Ni(OH)_2$, and combinations thereof; and
a plurality of bipolar current collectors, each of the plurality of bipolar current collectors being disposed between a negative electrode of one electrochemical battery unit cell and a positive electrode of an adjacent electrochemical battery unit cell.

2. The bipolar capacitor-assisted solid-state battery set forth in claim 1, wherein the negative electrode of at least one electrochemical battery unit cell comprises a base portion comprising a mixture of active negative electrode material particles and solid-state electrolyte material particles, and the capacitor coating overlays the base portion.

3. The bipolar capacitor-assisted solid-state battery set forth in claim 1, wherein the negative electrode of each electrochemical battery unit cell comprises a capacitor coating.

4. The bipolar capacitor-assisted solid-state battery set forth in claim 1, wherein the positive electrode of at least one electrochemical battery unit cell comprises a base portion comprising a mixture of active positive electrode material particles and solid-state electrolyte material particles, and the capacitor coating overlays the base portion.

5. The bipolar capacitor-assisted solid-state battery set forth in claim 1, wherein the positive electrode of each electrochemical battery unit cell comprises a capacitor coating.

6. The bipolar capacitor-assisted solid-state battery set forth in claim 1, wherein the negative electrode of at least one electrochemical battery unit cell comprises a capacitor coating overlying a base portion, the base portion of the negative electrode comprising a mixture of active negative electrode material particles and solid-state electrolyte material particles, and
wherein the positive electrode of at least one electrochemical battery unit cell comprises a capacitor coating overlying a base portion, the base portion of the positive electrode comprising a mixture of active positive electrode material particles and solid-state electrolyte material particles.

7. The bipolar capacitor-assisted solid-state battery set forth in claim 1, wherein the negative electrode of each electrochemical battery unit cell comprises a capacitor coating overlying a base portion, the base portion of the negative electrodes comprising a mixture of active negative electrode material particles and solid-state electrolyte material particles, and
wherein the positive electrode of each electrochemical battery unit cell comprises a capacitor coating overlying the base portion, the base portion of the positive electrodes comprising a mixture of active positive electrode material particles and solid-state electrolyte material particles.

8. The bipolar capacitor-assisted solid-state battery set forth in claim 1, wherein the first solid-state electrolyte material of the lithium ion-conductive electrolyte-containing separator of each electrochemical battery unit cell comprises an oxide-based inorganic solid, a sulfide-based inorganic solid, a solid polymer, or a combination thereof.

9. The bipolar capacitor-assisted solid-state battery set forth in claim 1, wherein at least one negative electrode of the electrochemical battery unit cells or at least one positive electrode of the electrochemical battery unit cells includes a base portion portion comprising a mixture of active electrode material particles, solid-state electrolyte particles, and capacitor material particles.

10. The bipolar capacitor-assisted solid-state battery set forth in claim 1, wherein a voltage between 5 V and 200 V is established across the negative end plate current collector and the positive end plate current collector when the battery is fully charged.

11. A method of manufacturing a bipolar capacitor-assisted solid-state battery, the method comprising:
producing a bipolar electrode of the bipolar capacitor-assisted solid-state battery, which includes:
forming a first electrode onto one side of a bipolar current collector, the first electrode being composed as either a negative electrode or a positive electrode;
forming a second electrode onto the bipolar current collector on a side of the bipolar current collector opposite from the side onto which the first electrode is formed, the second electrode being composed as either a negative electrode or a positive electrode, whichever is opposite from that of the first electrode, and wherein at least the first electrode, the second electrode, or both the first electrode and the second electrode includes a capacitor coating comprising a capacitor material and a first solid-state electrolyte material, wherein the capacitor material is a pseudo-capacitor material selected from the group consisting of: $RuO_2$, $MnO_2$, NiO, $Co_3O_4$, $Co(OH)_2$, $Ni(OH)_2$, and combinations thereof;
forming a lithium ion-conductive electrolyte-containing separator onto the first electrode, the second electrode, or both the first electrode and the second electrode, the lithium ion-conductive electrolyte-containing separator comprising a second solid-state electrolyte material and being devoid of a free liquid electrolyte;
stacking the bipolar electrode with one or more other bipolar electrodes to form the bipolar capacitor-assisted solid-state battery.

12. The bipolar capacitor-assisted solid-state battery set forth in claim 9, wherein the at least one negative electrode of the electrochemical battery unit cells or the at least one positive electrode of the electrochemical battery unit cells including the base portion comprising the mixture of active electrode material particles, solid-state electrolyte particles, and capacitor material particles is different from the at least one negative electrode of the electrochemical battery unit cells or the at least one positive electrode of the electrochemical battery unit cells including the capacitor coating comprising the capacitor material and the second solid-state electrolyte material.

13. The bipolar capacitor-assisted solid-state battery set forth in claim 9, wherein the at least one negative electrode of the electrochemical battery unit cells or the at least one positive electrode of the electrochemical battery unit cells including the base portion comprising the mixture of active electrode material particles, solid-state electrolyte particles, and capacitor material particles is the same as the at least one negative electrode of the electrochemical battery unit cells or the at least one positive electrode of the electrochemical battery unit cells including the capacitor coating comprising the capacitor material and the second solid-state electrolyte material.

14. The bipolar capacitor-assisted solid-state battery set forth in claim 1, wherein the first solid-state electrolyte material is the same as the second solid-state electrolyte material.

15. The bipolar capacitor-assisted solid-state battery set forth in claim 1, wherein the first solid-state electrolyte material is different from the second solid-state electrolyte material.

* * * * *